United States Patent
Moule et al.

(10) Patent No.: US 9,807,359 B1
(45) Date of Patent: Oct. 31, 2017

(54) SYSTEM AND METHOD FOR ADVANCED LENS GEOMETRY FITTING FOR IMAGING DEVICES

(71) Applicant: CHRISTIE DIGITAL SYSTEMS USA, INC., Cypress (CA)

(72) Inventors: Kevin Moule, Kitchener (CA); Eliezer Azi Ben-Lavi, Waterloo (CA); Derek Scott, Kitchener (CA); Daniel Thomson Urquhart, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 15/408,923

(22) Filed: Jan. 18, 2017

Related U.S. Application Data

(63) Continuation of application No. 62/420,775, filed on Nov. 11, 2016.

(51) Int. Cl.
  *G06T 7/80* (2017.01)
  *H04N 9/31* (2006.01)
  *G02B 27/00* (2006.01)
  *G02B 13/00* (2006.01)
  *G02B 13/06* (2006.01)

(52) U.S. Cl.
  CPC ....... *H04N 9/3185* (2013.01); *G02B 13/0005* (2013.01); *G02B 13/06* (2013.01); *G02B 27/0012* (2013.01); *H04N 9/3102* (2013.01)

(58) Field of Classification Search
  USPC ........ 348/744–747; 356/601–603, 606, 610; 345/633; 382/154
  See application file for complete search history.

(56) References Cited

U.S. PATENT DOCUMENTS

| | | | |
|---|---|---|---|
| 9,064,312 B2 * | 6/2015 | Majumder | H04N 9/3147 |
| 2009/0097039 A1 * | 4/2009 | Kawasaki | G01B 11/2509 |
| | | | 356/603 |
| 2013/0076789 A1 | 3/2013 | Majumder et al. | |
| 2015/0029222 A1 * | 1/2015 | Hofmann | G06K 9/00993 |
| | | | 345/633 |
| 2015/0098645 A1 * | 4/2015 | Leung | G06F 17/30811 |
| | | | 382/154 |

* cited by examiner

*Primary Examiner* — Paulos M Natnael
(74) *Attorney, Agent, or Firm* — Perry + Currier Inc.

(57) ABSTRACT

A system and method for advanced lens geometry fitting is provided for projecting images using a projector with a non-planar lens. An initial estimate of intrinsic parameters of the projector can be determined, for example from a list; an initial estimate of extrinsic parameters of the projector can be determined based on the initial estimate of intrinsic parameters. The intrinsic parameters and extrinsic parameters can be optimized together by starting with a simple lens model and iteratively adding nonlinear terms, an error function evaluated at each iteration, for example for each set of intrinsic parameters in the list and the corresponding extrinsic parameters. As the values of the error function converges the optimized intrinsic parameters and the optimized extrinsic parameters can be used to generate images that are projected by the projector.

19 Claims, 10 Drawing Sheets

Using An Initial Model Of A Non-Planar Lens That Relates A Position Of Points On An Object To Pixel Points At An Imager Of A Camera, Determine At Least One Initial Estimate Of Intrinsic Parameters Of The Camera Using The Initial Model
901

Determine At Least One Initial Estimate Of Extrinsic Parameters Of The Camera Using The At Least One Initial Estimate Of The Intrinsic Parameters
903

Iteratively Evaluate An Error Function That Includes A Comparison Between The Pixel Points And A Transformation Of The Points To The Pixel Points, An Initial Transformation Determined Using The At Least One Initial Estimate Of The Intrinsic Parameters And The At Least One Initial Estimate Of The Extrinsic Parameters, And Iterative Transformations Including One Or More Of: Varying One Or More Non-Linear Terms Used In The Initial Model, In One Or More Iterations; Increasing A Number Of The One Or More Non-Linear Term Used In The Model Of The Non-Planar Lens, In One Or More Of The Iterations; Varying Intrinsic Parameters Of The Camera; And Varying Extrinsic Parameters Of The Camera
905

When The Error Function, Of One Or More Iterations, One Or More Of Converges, Reaches A Minimum, And Is Less Than A Threshold Value: Store Current Value Of The Intrinsic Parameters Of The Camera And The Extrinsic Parameters Of The Camera As Pose Data
907

Control The Camera To Acquire Images Of the Object Based On The Pose Data
909

SYSTEM AND METHOD FOR ADVANCED LENS GEOMETRY FITTING FOR IMAGING DEVICES

CROSS-REFERENCE TO RELATED APPLICATION(S)

This application claims priority from U.S. Patent Application No. 62/420,775, filed Nov. 11, 2016, which is incorporated herein by reference.

FIELD

The specification relates generally to projectors, and specifically to a system and method for advanced lens geometry fitting for imaging devices.

BACKGROUND

Many projection systems will render images for projection, onto a screen and/or an object, based on properties of a projector projecting the images, and it is generally assumed that the projector includes a planar lens to project the images and/or planar projecting occurs when projecting the images. However, non-planar lenses, such as fisheye lenses, can be used with projectors, for wide field-of-view applications, and the like. Due to the additional degrees of freedom involved and because system of equations for an initialization of such modelling is not inherently linear modeling such non-planar lenses and/or non-planar projecting introduces technical challenges. In particular, modeling using random sample consensus (RANSAC) and/or polynomial techniques may not produce a suitable quality of alignment when projecting onto a screen and/or an object using such non-planar lenses and/or non-planar projecting. For example, such techniques can fail on at least two grounds: geometry-modeling approaches assume planar projection, which is not applicable to all lens types; and more naïve mathematical approaches fail to achieve the required accuracy levels, particularly for more complex screen geometry. Furthermore, cameras can also include non-planar lenses, and hence modelling of such cameras can suffer the same problems as modelling projectors that include non-planar lenses; for example, such cameras can be used with projections systems to provide feedback on images projected onto screens, objects, and the like, for example in projection mapping scenarios.

SUMMARY

In general, this disclosure is directed to a system and method for advanced lens geometry fitting for projecting images using projectors with non-planar lenses which can include fisheye lenses and/or "fθ" (also referred to as F-Theta) lenses used for wide field-of-view applications. In particular, an initial estimate of intrinsic parameters of a projector are determined, for example using a given model of the non-planar lens of the projector that relates projector points (e.g. in projection space at a screen and/or an object) to pixel points (e.g. at an image modulator of the projector). It is assumed that the geometry of the screen and/or object onto which projection is occurring has been determined and/or provided. From the initial estimate of the intrinsic parameters, an initial estimate of the extrinsic parameters is obtained. The initial estimates of the intrinsic parameters and the extrinsic parameters are used as input to an iterative determination of an error function that includes a comparison between transformed projector points and pixel points, the transformed projector points representing an estimate of the pixel points using the model and estimates of the intrinsic parameters and the extrinsic parameters. Once the error function converges, minimizes and/or falls below a threshold value, current values of the intrinsic parameters and the extrinsic parameters are used to project images from the projector onto the screen and/or object. The current values of the intrinsic parameters and the extrinsic parameters can be referred to as pose data of the projector.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system comprising: a computing device; a projector comprising a non-planar lens, the projector configured for projection onto a object; the computing device configured to: using an initial model of the non-planar lens that relates a position of projected points on the object to pixel points at an image modulator of the projector, determine at least one initial estimate of intrinsic parameters of the projector using the initial model; determine at least one initial estimate of extrinsic parameters of the projector using the at least one initial estimate of the intrinsic parameters; iteratively evaluate an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the model of the non-planar lens, in one or more of the iterations; varying intrinsic parameters of the projector; and varying extrinsic parameters of the projector; when the error function, of one or more iterations, one or more of converges, reaches a minimum, and is less than a threshold value: store current value of the intrinsic parameters of the projector and the extrinsic parameters of the projector as pose data; and, control the projector to project images onto the object based on the pose data.

The computing device can be further configured to determine at least one initial estimate of intrinsic parameters of the projector using the initial model by determining a range of estimates for each of a plurality of the intrinsic parameters. The computing device can be further configured to determine at least one initial estimate of intrinsic parameters of the projector using the initial model by determining a set of discrete estimates of a plurality of the intrinsic parameters. The computing device can be further configured to determine the at least one initial estimate of extrinsic parameters for each element of the set of discrete estimates of the plurality of the intrinsic parameters. The computing device can be further configured to determine the at least one initial estimate of the extrinsic parameters by extrapolating a line between a given projection point and a corresponding point at a curved image modulator that has a curvature similar to that of the non-planar lens, to a pixel point on flat image modulator that shares a principal point with the curved image modulator. The computing device can be further configured to determine the at least one initial estimate of the extrinsic parameters using a direct linear transformation algorithm using a set of pixel points on the flat image modulator. The computing device can be further configured to iteratively evaluate the error function for each element of the set of discrete estimates of the plurality of the intrinsic parameters and the corresponding estimates of the extrinsic parameters.

The non-planar lens can comprise one or more of a fisheye lens and an f-theta lens.

The initial model of the non-planar lens can comprise one or more of a fisheye lens model and an f-theta lens model.

The initial model of the non-planar lens can comprise one or more of: zero non-linear terms, one non-linear term, and a plurality of non-linear terms.

An aspect of the specification provides a method comprising: at a computing device in communication with a projector comprising a non-planar lens, the projector configured for projection onto a object: using an initial model of the non-planar lens that relates a position of projected points on the object to pixel points at an image modulator of the projector, determining, at the computing device, at least one initial estimate of intrinsic parameters of the projector using the initial model; determining, at the computing device, at least one initial estimate of extrinsic parameters of the projector using the at least one initial estimate of the intrinsic parameters; iteratively evaluating, at the computing device, an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the initial model of the non-planar lens, in one or more of the iterations; varying intrinsic parameters of the projector; and varying extrinsic parameters of the projector; when the error function, of one or more iterations, one or more of converges, reaches a minimum, and is less than a threshold value: store current value of the intrinsic parameters of the projector and the extrinsic parameters of the projector as pose data; and, controlling, at the computing device, the projector to project images onto the object based on the pose data.

The method of claim can further comprise: determining at least one initial estimate of intrinsic parameters of the projector using the initial model by determining a range of estimates for each of a plurality of the intrinsic parameters. The method of claim can further comprise: determining at least one initial estimate of intrinsic parameters of the projector using the initial model by determining a set of discrete estimates of a plurality of the intrinsic parameters. The method of claim can further comprise: determining the at least one initial estimate of extrinsic parameters for each element of the set of discrete estimates of the plurality of the intrinsic parameters. The method of claim can further comprise: determining the at least one initial estimate of the extrinsic parameters by extrapolating a line between a given projection point and a corresponding point at a curved image modulator that has a curvature similar to that of the non-planar lens, to a pixel point on flat image modulator that shares a principal point with the curved image modulator. The method of claim can further comprise: determining the at least one initial estimate of the extrinsic parameters using a direct linear transformation algorithm using a set of pixel points on the flat image modulator. The method of claim can further comprise: iteratively evaluating the error function for each element of the set of discrete estimates of the plurality of the intrinsic parameters and the corresponding estimates of the extrinsic parameters.

The non-planar lens can comprise one or more of a fisheye lens and an f-theta lens.

The initial model of the non-planar lens can comprise one or more of a fisheye lens model and an f-theta lens model.

The initial model of the non-planar lens can comprise one or more of: zero non-linear terms, one non-linear term, and a plurality of non-linear terms.

An aspect of the specification provides a computer-readable medium storing a computer program, wherein execution of the computer program is for: at a computing device in communication with a projector comprising a non-planar lens, the projector configured for projection onto a object: using an initial model of the non-planar lens that relates a position of projected points on the object to pixel points at an image modulator of the projector, determining, at the computing device, at least one initial estimate of intrinsic parameters of the projector using the initial model; determining, at the computing device, at least one initial estimate of extrinsic parameters of the projector using the at least one initial estimate of the intrinsic parameters; iteratively evaluating, at the computing device, an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model in one or more iterations; increasing a number of the one or more nonlinear terms used in the initial model of the non-planar lens, in one or more of the iterations; varying intrinsic parameters of the projector; and varying extrinsic parameters of the projector; when the error function, of one or more iterations, one or more of converges, reaches a minimum, and is less than a threshold value: store current value of the intrinsic parameters of the projector and the extrinsic parameters of the projector as pose data; and, controlling, at the computing device, the projector to project images onto the object based on the pose data. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 9 depicts a method for advanced lens geometry fitting for acquiring images, according to non-limiting implementations.

DETAILED DESCRIPTION

Figure 1:
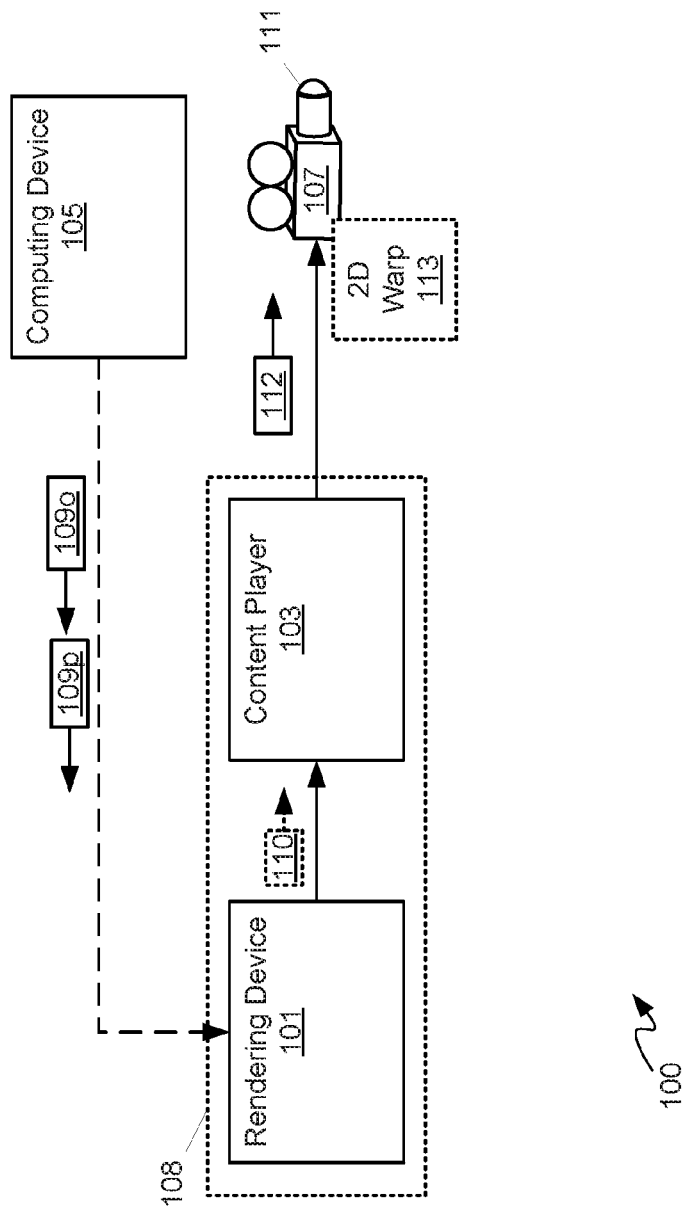
FIG. 1 depicts a projection system, according to non-limiting implementations.

FIG. 1 depicts a system 100 comprising: a rendering device 101 (interchangeably referred to hereafter as device 101); a content player 103; a computing device 105; and a projector 107. In general, device 101 is in communication with content player 103 and optionally computing device 105, and content player 103 is in communication with projector 107. Projector 107 includes a non-planar lens 111 including, but not limited to, a fisheye lens, an f-theta lens and the like. Indeed, an F-theta lens is appreciated to be a specific type of fisheye lens. As used herein, the term "fisheye lens" and/or non-planar lens, can generally to refer to any lens whose angle from a lens axis grows more rapidly as with from a center of an imaging element (such as a DMD (digital multimirror device, a CCD (charge coupled device), and the like) than it would with a planar (e.g. rectilinear) lens; such non-planar lenses and/or fisheye lenses can include, but are not limited to, stereographic lenses, equidistant lenses, equisolid lenses, orthogrpahic lenses, and the like, all of which are included in the scope of the present specification.

As depicted, device 101 and content player 103 are combined into one device 108, however in other implementations device 101 and content player 103 can be separate devices. Computing device 105 is configured to generate pose data 109p comprising extrinsic parameters and intrinsic parameters of projector 107, including lens 111, as described in further detail below. Device 101 can generate rendered image data 110 from pose data 109p, for example by rendering existing image data (not depicted) for projection by projector 107. In FIG. 1, solid lines connecting components show flow of image and/or video data there between, while the stippled line connecting computing device 105 to device 101 and/or device 108 shows flow of pose data 109p and object data 109o there between. Object data 109o generally comprises a model of a location and orientation of a an object onto which images from projector 107 are projected, and can be determined by computing device 105 using one or more cameras.

When device 101 and content player 103 are separate, device 101 communicates image data 110 to content player 103, which processes and/or "plays" image data 110 by producing projection data 112 suitable for processing and projection by projector 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 108 can render projection data 112 (e.g. video data) in real-time without producing image data 110. In any event, projection data 112 is communicated to projector 107 by content player 103 where projection data 112 is used to control projector 107 to project images based thereupon, for example onto a three-dimensional object.

Device 101 generally comprises an image generator and/or renderer, for example a computing device, a server and the like, configured to generate and/or render images as image data 110. Such image data 110 can include, but is not limited to, still images, video and the like. Furthermore, while not depicted device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Computing device 105 comprises any suitable combination of projectors (including projector 107), cameras (not depicted in FIG. 1), and computing devices configured to one or more of: automatically determine pose data 109p of projector 107; and automatically determine object data 109o. Non-limiting implementations of computing device 105, and functionality thereof, will be described below with reference to FIGS. 2 to 7.

Projector 107 comprises a projector configured to project projection data 112, including but not limited to a digital projector, a cinema projector, an LCOS (Liquid Crystal on Silicon) based projector, a DMD (digital multimirror device) based projector and the like. Furthermore, while only one projector 107 is depicted, system 100 can comprise a plurality of projectors 107, each configured to project respective projection data comprising, for example, portions of larger tiled image to be projected. Regardless of a technology used in projector 107, it is assumed that projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of a image to be projected.

As depicted system 100 further comprises one or more 2D ("two-dimensional") warping devices and/or modules 113, for example at projector 107 (though such a warping device can be present at content player and/or as a stand-alone device) When present, projection data 112 can be warped by warping module 113, for example by moving and/or adjusting pixels within projection data 112, to adjust projection data 112 for projection by projector 107 onto an object including, but not limited to, a screen, an object and the like. However, as computing device 105 determines pose data 109p and communicates such to device 101 (and/or device 108), warping module 113 can be unused, optional and/or eliminated from system 100. Indeed, use of warping module 113 represents how images were processed according to the prior art and the presence of warping module 113 is obviated by virtue of computing device 105 providing device 101 (and/or device 108) with pose data 109p. However, in some implementations, warping module 113 can be used to make small changes to projection of images onto a physical object, for example when a virtual model of the object used to produce the images does not precisely match the physical object.

While each of device 101, content player 103, computing device 105, and projector 107 are depicted as distinct components, in other implementations, respective portions of one or more of device 101, content player 103, computing device 105, and projector 107 and can be implemented within the same device (e.g. device 108) and/or processing resources can be shared there between. For example, while not depicted, system 100 comprises one or more controllers, one or more processors, one or more memories and one or more communication interfaces, for example a controller, memory and communication interface for each of device 101, content player 103, computing device 105, and projector 107 and/or to be shared among device 101, content player 103, computing device 105, and projector 107. Indeed, in general, components of system 100, as depicted, represent different functionality of a projection system where: pose data 109p of projector 107 can be automatically determined. In some implementations, system 100 includes components and/or functionality for projection mapping onto three-dimensional objects and/or for updating pose data 109p when projector 107 moves, and/or a screen and/or object, onto which images are being projected, moves.

Figure 2:
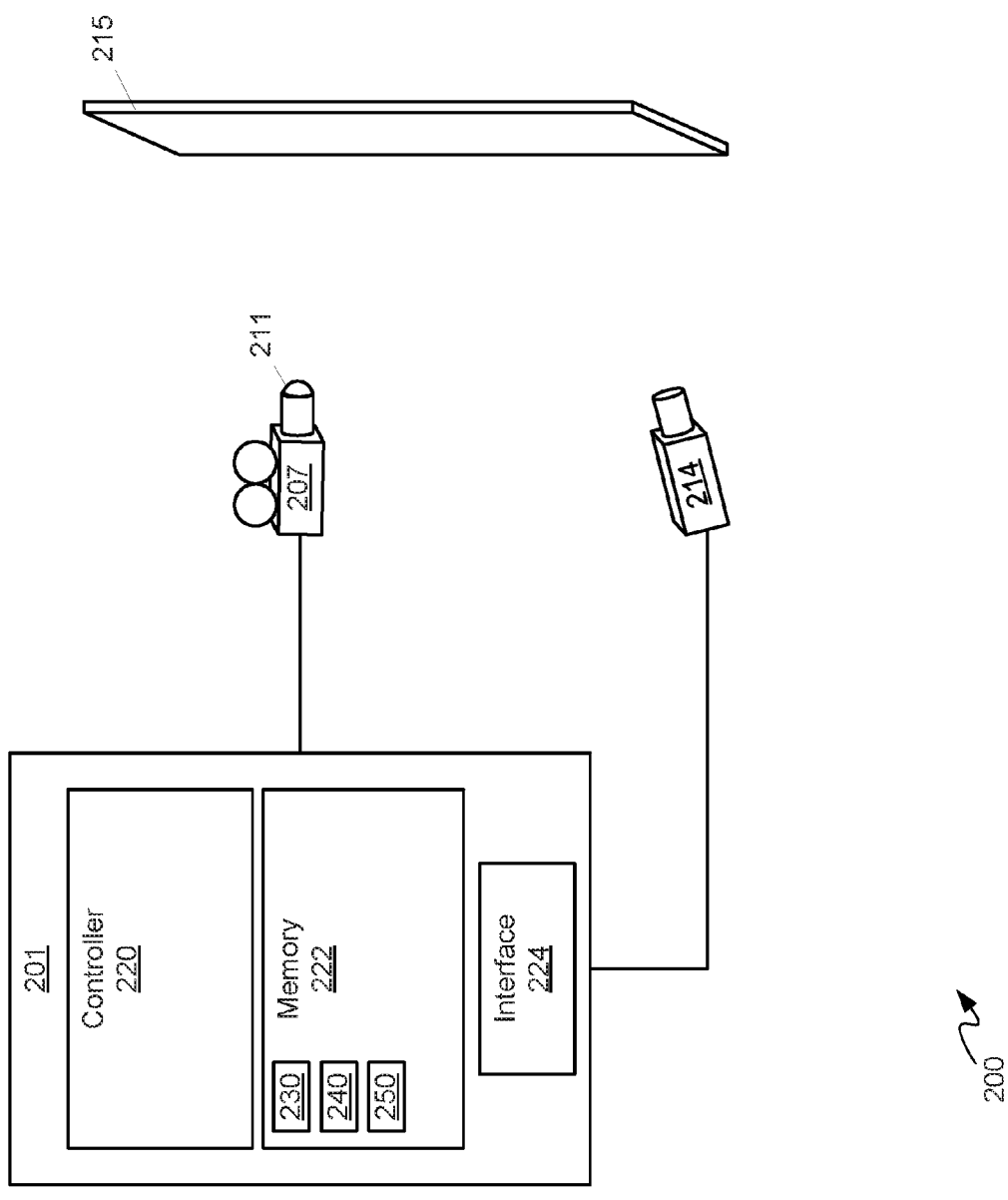
FIG. 2 depicts a system for advanced lens geometry fitting for projecting images which can be used in the system of FIG. 1, according to non-limiting implementations.

Attention is next directed to FIG. 2 which depicts a system 200 for advanced lens geometry fitting for projecting images. Indeed, computing device 105 can include one or more components of system 200, and furthermore components of system 100 can comprise components of system 200 as desired. System 200 comprises a computing device 201 (interchangeably referred to hereafter as device 201), a projector 207, comprising a non-planar lens 211; an optional camera 214; and a screen 215 onto which images from projector 207 are to be projected. Indeed, it is assumed that projector 207 is mounted relative to screen 215 such that images from projector 207 are projected onto screen 215. Further, it is assumed that optional camera 214 can be used to determine geometry of screen 215 and to determine correspondences between projected points of projector 207 to pixel points of projector 207.

However, while present implementations are described with respect to screen 215, in other implementations, screen 215 can be replaced with an object, including a three-dimensional object, and projector 207 can projection map onto the object using lens 211.

In general, comparing FIG. 1 and FIG. 2, projector 107 can comprise projector 207 (and similarly, lens 111 can comprise lens 211), computing device 105 can comprise computing device 201, projector 207 (with lens 211), and optional camera 214, and any of device 101 and content player 103 can comprise at least a portion of computing device 201, for example when resources are shared amongst device 101, content player 103 and computing device 105. Furthermore, while only one projector 207 is depicted, system 200 can comprise more than one projector. Similarly, while only one optional camera 214 is depicted, system 200 can comprise more than one camera 214; it is further appreciated that camera(s) 214 of system 200 can comprise digital camera which can covey digital pictures to computing device 201.

Device 201 can comprise any suitable computing device, including but not limited to a graphics processing unit (GPU), a graphics processing device, a graphics processing engine, a video processing device, a personal computer (PC), a server, and the like, and generally comprises a controller 220, a memory 222 and a communication interface 224 (interchangeably referred to hereafter as interface 224) and optionally any suitable combination of input devices and display devices.

Interface 224 comprises any suitable wired or wireless communication interface configured to communicate with projector 207 and camera 214 (and any of device 101, content player 103, computing device 105, and device 108) in a wired and/or wireless manner as desired.

Controller 220 can comprise a processor and/or a plurality of processors, including but not limited to one or more central processors (CPUs) and/or one or more processing units; either way, controller 220 comprises a hardware element and/or a hardware processor. Indeed, in some implementations, controller 220 can comprise an ASIC (application-specific integrated circuit) and/or an FPGA (field-programmable gate array) specifically configured to determine at least pose data of a projector, for example projector 207. Hence, device 201 is preferably not a generic computing device, but a device specifically configured to implement specific pose data determination functionality. For example, device 201 and/or controller 220 can specifically comprise a computer executable engine configured to implement specific pose data determination functionality.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory 222 and used by controller 220 which makes appropriate utilization of volatile storage during the execution of such programming instructions. Those skilled in the art recognize that memory 222 is an example of computer readable media that can store programming instructions executable on controller 220. Furthermore, memory 222 is also an example of a memory unit and/or memory module and/or a non-volatile memory.

In particular, memory 222 stores an application 230 that, when processed by controller 220, enables controller 220 and/or computing device 201 to: using an initial model of non-planar lens 211 that relates a position of projected points on an object (including, but not limited to screen 215) to pixel points at an image modulator of projector 207, determine at least one initial estimate of intrinsic parameters of projector 207 using the initial model; determine at least one initial estimate of extrinsic parameters of projector 207 using the at least one initial estimate of the intrinsic parameters; iteratively evaluate an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the model of non-planar lens 211, in one or more of the iterations; varying intrinsic parameters of projector 207; and varying extrinsic parameters of projector 207; when the error function, of one or more iterations, one or more of converges, reaches a minimum, and is less than a threshold value: store current value of the intrinsic parameters of projector 207 and the extrinsic parameters of projector 207 as pose data 109$p$; and, control projector 207 to project images onto the object (including, but not limited to screen 215) based on pose data 109$p$.

In other implementations, as depicted, memory 222 further stores a model 240 of the object onto which images are to be projected (e.g. screen 215), which can be determined using camera 214 and projector 207 and/or another projector (not depicted), for example, by controlling projector 207, and the like, to project images, such as boxes, structured light patterns, and the like, onto the object (e.g. screen 215) and determine a geometry thereof from images acquired by camera 214; however, in other implementations, model 240 can be provisioned at memory 222 using, for example, a given digital model supplied with the object (e.g. screen 215). In general, object data 109$o$ can comprise model 240, and can be optionally provided to components of system 100 as described above.

In particular, camera 214 can be used in a process to map projected points to pixel points. For example, computing device 201 can control projector 207 to project single pixels of the image modulator of projector 207 onto screen 215, or any other object; camera 214 can acquire a digital picture of the object (e.g. screen 215) onto which the pixel is being projected and convey that digital picture to computing device 201. Assuming that a relative geometry of camera 214 and the object (e.g. screen 215) onto which the pixel is being projected is known and/or has been determined (e.g. from model 240), then a set of correspondences between the projected points and the pixel points can be determined.

Furthermore, as depicted, memory 222 further stores an initial model 250 of lens 211 which can be supplied with lens 211, for example by a manufacturer and/or can be determined based on a type of lens 211. Hence, for example, when lens 211 comprises an f-theta lens, a model of lens 211 can comprise a known model of an f-theta lens.

In any event, computing device 201 and/or controller 220 is generally configured to determine pose data 109$p$ of projector 207.

In general, pose data 109$p$ includes information about projector 207 which includes intrinsic parameters and extrinsic parameters.

Figure 3:
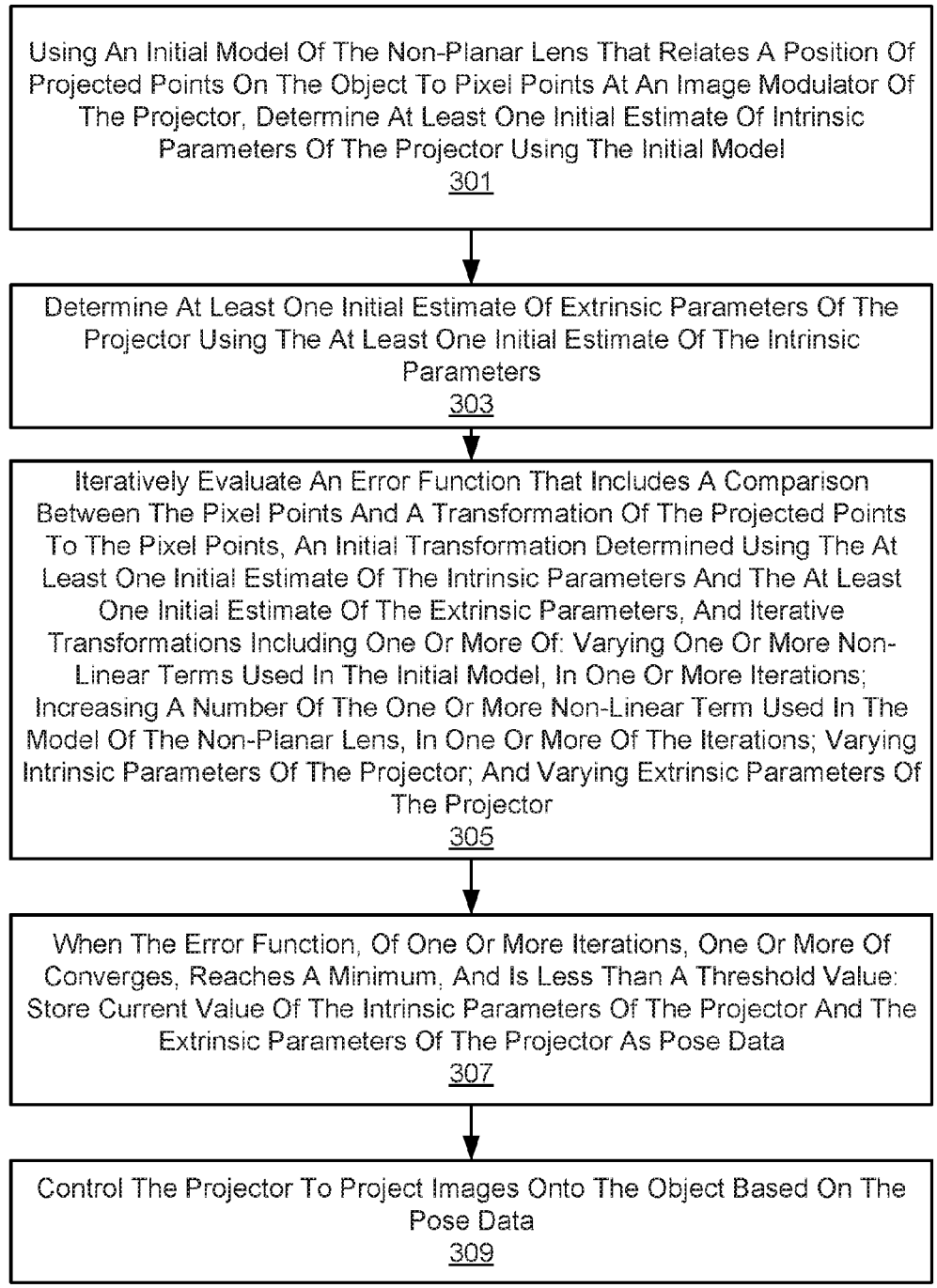
FIG. 3 depicts a method for advanced lens geometry fitting for projecting images, according to non-limiting implementations.

Attention is now directed to FIG. 3, which depicts a flowchart of a method 300 for advanced lens geometry fitting for projecting images, according to non-limiting implementations. In order to assist in the explanation of method 300, it will be assumed that method 300 is performed using system 200, and specifically by controller 220 of device 201, for example when controller 220 processes application 230. Indeed, method 300 is one way in which system 200 and/or device 201 can be configured. Furthermore, the following discussion of method 300 will lead to a further understanding of device 201, and system 200 and its various components. However, it is to be understood that system 200 and/or device 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while computing device 201 is described as implementing and/or performing each block of method 300, it is appreciated that each block of method 300 occurs using controller 220 processing application 230.

At block 301, controller 220, using an initial model of non-planar lens 211 that relates a position of projected points on an object (including, but not limited to screen 215) to pixel points at an image modulator of projector 207, determines at least one initial estimate of intrinsic parameters of projector 207 using the initial model.

At block 303, controller 220 determines at least one initial estimate of extrinsic, parameters of projector 207 using the at least one initial estimate of the intrinsic parameters.

At block 305, controller 220 iteratively evaluates an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the initial model of non-planar lens 211 in one or more of the iterations; varying intrinsic parameters of projector 207; and varying extrinsic parameters of projector 207.

At block 307, controller 220, when the error function, of one or more iterations, one or more of converges, reaches a minimum, and is less than a threshold value: stores current value of the intrinsic parameters of projector 207 and the extrinsic parameters of projector 207 as pose data 109$p$.

At block 309, controller 220 controls projector 207 to project images onto the object (including, but not limited to screen 215) based on pose data 109$p$.

A non-limiting example of method 300 will now be described, assuming that projector 207 comprises a DMD projector and hence includes a DMD image modulator with square mirrors (e.g. square pixels), though the following description can apply to other types of projectors and other types of image modulators. Similarly, the following discussion assumes that lens 211 comprises a fisheye lens and/or an f-theta lens that can be modelled using odd nonlinear terms, for example to account for rotational geometries that include negative coordinates, though other types of non-planar lenses and/or other types of models (e.g. that include even terms) are within the scope of present implementations. Furthermore, the following non-limiting example will be described with respect to projecting onto screen 215, however, it is understood that projection can occur on other types of objects.

As described above, pose data 109$p$ can include both extrinsic parameters and intrinsic parameters and together the extrinsic parameters and intrinsic parameters define the position and optical properties of the combination of projector 207 with lens 211.

The extrinsic parameters can include an orientation and position of projector 207 in the physical space of system 200, for example with respect to screen 215, and which can be expressed as x-y-z coordinates of projector 207, assuming a rectilinear coordinate system, as well as a yaw coordinate, a pitch coordinate, and a roll coordinate. In particular, the extrinsic parameters can be summarized in 6-dimensional vector: [x,y,z,yaw,pitch,roll]. The coordinate space in which the coordinates of the vector are expressed can be defined with respect to an origin of system 200 which can be arbitrary and/or defined with respect to screen 215, for example using model 240 and/or object data 109o. However, the extrinsic parameters are generally independent of a position of screen 215. Furthermore, while extrinsic parameters are described herein with respect to a rectilinear coordinate system, extrinsic parameters can be expressed in other types of coordinate systems. hence, The intrinsic parameters can include parameters of projector 207 associated with lens 211 and specifically optical properties of the combination of projector 207 and lens 211 that define how the combination projector 207 and lens 211 projects images, for example onto screen 215. However, the extrinsic parameters are generally independent of screen 215. Such intrinsic parameters are described herein with respect to a rotational coordinate system and can include the following parameters:

f—a factor for converting angles (in degrees) offset from a principal axis (center) of lens 211, in pixel width coordinates.

$o_x, o_y$—pixel coordinates of a principal point (e.g. where an image modulator of projector 207 intersects the principal axis).

a—pixel width divided by pixel height (e.g. of a physical pixel of the image modulator of projector 208); for implementations where the image modulator of projector 208 comprises a DMD, and the, mirrors of the DMD are square, a can set to 1 (i.e. indicating square pixels).

k—odd powers of model 250, which can be alternatively referred to as a projection model.

For example, model 250 of non-planar lens 211 can be defined as:

$$r(\theta) = f\theta + \Sigma_{i=1}^{M} k_i \theta^{2i+1} \quad \text{Equation (1)}$$

where θ is an angle (in degrees) between the principal axis and a projected point in projector space, r is the distance between the projected point and the principal point expressed in pixel width units, and M is a maximum number of nonlinear terms to be include in the model.

Figure 4:
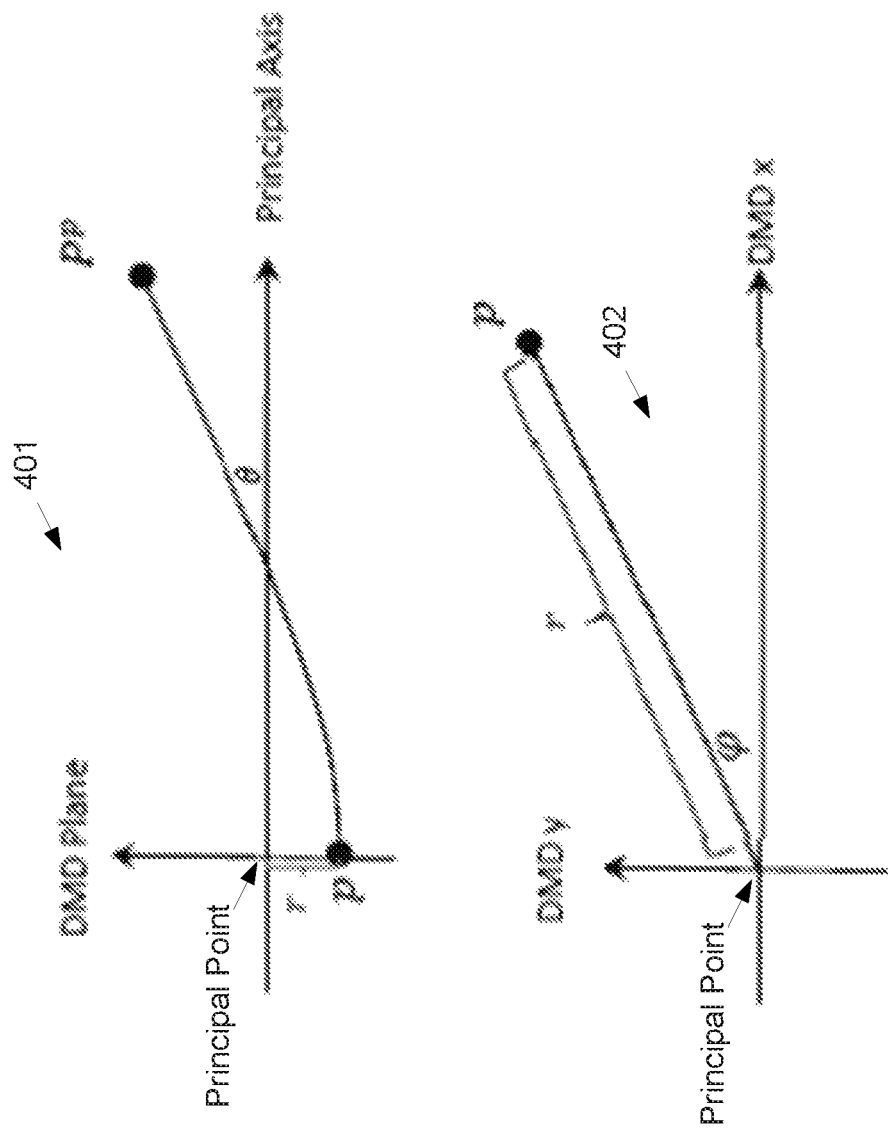
FIG. 4 depicts relationships between points in a projector space and points on an image modulator of a projector, assuming the projector comprises an f-theta lens, according to non-limiting implementations.

For example, attention is directed to FIG. 4 which, in a top graph 401, depicts relationships between a physical 3D (three-dimensional) point in projector space, $P^p$ (e.g. projected points in a projection path which can be between lens 211 and screen 215), and a coordinate, p, of its mapping back to a DMD plane in pixel width units, assuming that projector 207 comprises a DMD projector and lens 211 comprises a fisheye lens and/or an f-theta lens. Indeed, while the implementation of FIG. 4 is described with respect to a DMD projector having a DMD image modulator, other types of projectors with other types of image modulators, and hence other types of image modulator planes, are within the scope of the present specification. In some implementations, $P^p$ can be a point on screen 215, but alternatively can be a 3D point in space in a field-of-view of lens 211; for example, for fisheye lenses, a field-of-view can be greater than 180°. FIG. 4 can alternatively be referred as an illustration of a projection model of a fisheye lens.

In particular, coordinate p is located a distance r from the principal point principal axis, and corresponding projector point $P^p$ is at an θ from the principal axis in projector space. Indeed, r and θ in FIG. 3 are the r and θ from Equation 1. Coordinate p can also be referred to as a pixel point p, though such a term is not meant to imply that pixel point p explicitly corresponds to a pixel of the DMD; rather pixel point p merely refers to a position on the DMD (and/or an image modulator).

Bottom graph 402 of FIG. 4 defines a position of pixel point p from the principal point on the DMD in rotational coordinates. As in graph 401, pixel point p is located at a distance r from the principal point, and at an angle φ from an x-axis of the DMD; angle φ can be derived using:

$$\tan(\varphi) = \frac{P_y^p}{P_x^p} \quad \text{Equation (2)}$$

where $P_y^p$ is they coordinate of projector point $P^p$ in projector space, and $P_x^p$ is the a x coordinate of projector point $P^p$ in projector space. For example, it is assumed that an angle of projector point $P^p$ in projector space from principal axis is similar to that of angle φ of pixel point p on the DMD. Hence, a plurality of pixel points p of an image modulator (e.g. a DMD) can be found using, for example, projector points $P^p$ which can be defined by the model 240 of screen 215, and/or, projector points $P^p$ can alternatively be any points in 3D space on a projection path of projector 207.

Once the coordinates of pixel points p on the image modulator (e.g. DMD) are found, the coordinates can be translated to into rectilinear pixel positions using the following equations:

$$p_x = r(\theta)\cos(\varphi) + o_x$$

$$p_y = a \cdot r(\theta)\sin(\varphi) + o_y \quad \text{Equations (3)}$$

r(θ) of Equations (3) can comprise r(θ) of Equation (1), with M set to 3 nonlinear terms, however, M can be set to other values greater than 3 or less than 3 depending, for example, on processing power of controller 220. However, assuming 3 nonlinear terms, $k_1$, $k_2$, $k_3$, intrinsic parameters of projector 207 and/or lens 211 can be represented by a 7-dimensional vector $[f, o_x, o_y, a, k_1, k_2, k_3]$.

Hence, intrinsic parameters and extrinsic parameters can be expressed in a vector V that includes 7-dimensional vector $[f, o_x, o_y, a, k_1, k_2, k_3]$ and 6-dimensional vector: $[x, y, z, yaw, pitch, roll]$, combined.

Iterative Evaluation of an Error Function (e.g. Blocks 305, 307 of Method 300)

Prior to discussing blocks 301, 303 of method 300, a non-limiting example of the iterative evaluation of blocks 305, 307 of method 300 will be described.

In particular, a list of N correspondences between projected points P and corresponding pixel points p, can be provided and/or determined, and a best estimation of the intrinsic parameters/extrinsic parameters vector V can be determined, as described below. The list of N correspondences can be of the form:

$$[P_i, p_i]_{i=1}^{N} \quad \text{Equation (4)}$$

where $P_i$ is a point in a coordinate system of system 200 (e.g. a real world and/or 3D coordinate system) which can correspond to a position on screen 215 and/or be arbitrary, but is generally in a projection path of the combination of projector 207 and lens 211, and $p_i$ is the corresponding pixel point, as described above with reference to FIG. 4. Hence, each $P_i$ need not be explicitly be located on screen 215, but can be a point in space in a projection path of the combination projector 207 with lens 211, though it can be assumed that screen 215 intersects this projection path.

In particular, however, $[P_i, p_i]_{i=1}^{N}$ can be determined by computing device 201 controlling projector 207 to project individual pixels onto screen 215, and camera 214 can be used to determine a corresponding projected point on the screen. In other words, a given pixel point $p_i$ corresponds to a position of a pixel at an image modulator of projector 207, and such a position and shape of the pixel can be known from the resolution of projector 207, as well as an aspect ratio of pixels of the projector. Similarly, as a geometry of system 200 can be known, including a correspondence between locations of pixels of camera 214 and positions on screen 215 (and/or another object), a position of a corresponding projected coordinate Pi for a given pixel point pi can be determined. Such a correspondence can be determined for "N" of the pixels which can include all the pixels and/or a subset thereof (for example corner pixels, edge pixels, a grid of the pixels, diagonals of the pixels, and the like).

An error function (alternatively referred to as an error metric) can be defined as:

$$err = 1/N \Sigma_{i=}^{N} L((T(P_i) - p_i)^2)$$  Equation (5)

where T is a transformation from the 3D coordinates of system 200 to pixel coordinates, and is determined from vector V, as described above. In other words, given a set of intrinsic parameters/extrinsic parameters (including, but not limited to, an initial estimation of intrinsic parameters/extrinsic parameters), and a position Pi in space, a location of a corresponding pixel point can be found using T ($P_i$), and T ($P_i$) compared with a pixel point pi with which the position Pi in space is associated. Furthermore, L is a loss function, which can include, but is not limited to, the Huber loss function.

Hence, by performing the transformation T on each point Pi in the set of correspondences, comparing with the associated pixel point pi, applying the loss function and summing (and alternatively dividing by N), the error function of Equation (5) represents an evaluation of whether the given set of intrinsic parameters/extrinsic parameters accurately represent lens 211. For example, the comparison between a transformation T of a point Pi and an associated pixel point pi can include determining a difference there between.

Hence, to provide better estimations, the extrinsic parameters and intrinsic parameters of the projector can be obtained by solving the following optimization problem:

$$\mathrm{argmin}_V(err)$$  Equation (6)

where $\mathrm{argmin}_V$ comprises a process to minimize "err" of Equation (6) as described below. Indeed, optimization of $\mathrm{argmin}_V$ can be solved using various algorithms and/or mathematical algorithms and/or mathematical packages (including, but not limited to the Ceres solver).

Regardless, an initial estimate for V (e.g. an initial estimate of each of the intrinsic parameters and the extrinsic parameters) can be obtained that is selected such that optimization of $\mathrm{argmin}_V$ converges and/or reaches a minimum and/or falls below a threshold value. Hence, initializing of optimization of $\mathrm{argmin}_V$ occurs in blocks 301, 303 as described in further detail below. In some implementations, an initial estimate of each of the intrinsic parameters and the extrinsic parameters can be provided based heuristically, for example, on a known estimated geometry of system 200, projector 207 with lens 211 and/or screen 215. In other implementations, an initial estimate of intrinsic parameters can be provided heuristically and an initial estimate of extrinsic parameters can occur automatically. In yet further implementations, an initial estimate of each of intrinsic parameters and extrinsic parameters can occur automatically. In yet further implementations, an initial estimate of the extrinsic parameters could be specified heuristically and an initial estimate of the intrinsic parameters can occur automatically.

With reference to Equation (1), an initial estimation of intrinsic parameters can include setting each nonlinear term $k_1$, $k_2$, $k_3$ (assuming M=3) to zero and/or an initial estimation of intrinsic parameters can always contain zeros for the nonlinear terms. As such Equation (1) collapses to:

$$r(\theta) = f\theta$$  Equation (1a)

Similarly, V can collapse to [f,$o_x$,$o_y$,a,0,0,0] However, the model can be iteratively refined by adding more nonlinear terms (for example, see below). While adding nonlinear terms can cause non-convergence, as more degrees of freedom are added, such an addition of nonlinear terms can be performed gradually, and/or one at a time, and each iteration can be evaluated to determine whether convergence occurs or not. Put another way "cost" of each solution can be evaluated, with lower cost being a goal of the evaluation.

For example, the following algorithm can be used:

Step 1: Let $V_i$ be an initial estimation of the V vector, let $V_f$ be an interim solution of the V vector with a current lowest cost solution, and let $C_f$ be the cost of the current lowest cost solution (e.g. each of $V_f$ and $C_f$ represent a "best" interim solution during an iteration, and the term "cost" can refer to a value of "err" of Equation (5)).

Step 2: Defining a counter K to be a counter of a current nonlinear term being evaluated, initialize using K=0 nonlinear terms (e.g. initially assume M=0 in Equation (5)), $V_f = V_i$ and assume that $C_f = \infty$.

Step 3: Starting with $V_f$, find an optimized solution $V_o$ and the cost associated with it $C_o$, using, for example, Equation (5) for the set of N correspondences and one or more of: varying intrinsic parameters of the combination of projector 207 and lens 211; and varying extrinsic parameters of projector 207; for example intrinsic parameters and/or extrinsic parameters are varied until the error function of, one or more iterations, one or more of converges, reaches a minimum, and is less than a threshold value. Hence, $C_o$ can represent a lowest value of "err" of Equation (5) for a given set of iterations.

Step 4: If $C_o < C_f = C_o$:
  a. Set $V_f = V_o$ and $C_f = C_o$.
  b. If K<M (for example M=3)
    i. Increment K (e.g. to increase a number of nonlinear terms).
    ii. Return to Step 3.
  c. Else
    i. Return $V_f$
Step 5: Else
  a. Return $V_f$ In Step 4: b. it is assumed that M=3 (e.g. K iterates to "3") such that three nonlinear terms are evaluated, however other values of M can be used, for example to evaluate the effect of higher order nonlinear terms on the algorithm.

Hence, the algorithm described above represents a non-limiting implementation of blocks 305, 307 of method 300. Put another way, the above algorithm attempts to minimize the error function of Equation (5) over the space of vector V.

Furthermore, the test of $C_o < C_f$ indicates a comparison of current value of the cost with a previous value to determine whether convergence is occurring. As long as convergence is occurring the algorithm can continue. Alternatively, the algorithm can continue until the cost is minimized and/or falls below a threshold value (e.g. which indicates a convergence and/or a solution which is heuristically "good enough"). Put another way, the error function of one or more iterations, one or more converges, reaches a minimum, and is less than a threshold value.

It is furthermore appreciated that, in some implementations, convergence can occur without adding non-linear terms (e.g. M=0 and/or convergence occurs for K=0). Hence, the initial model can include one or more of zero nonlinear terms, one nonlinear term and a plurality of nonlinear terms, with the algorithm above being evaluated for the number of nonlinear terms in the initial model (as defined by "M").

In any event, the $V_f$ that is returned from the algorithm can be incorporated into pose data 109p, as well as extrinsic parameters that caused the error function to converge, and the like. With reference to FIG. 1, the pose data 109p can then returned to device 108 and used to control projector 107 (and/or projector 207) to project images for example using projection data 112 produced from pose data 109p, for example at block 309.

Various implementations for initializing method 300 will now be described and in particular various implementations of blocks 301, 303.

Initialize Intrinsic Parameters (e.g. as in Block 301)

For the intrinsic parameters, an initial estimate for each intrinsic parameter can be determined and used to estimate the extrinsic parameters (see below), and which is also used as a starting point for the optimization described above. The intrinsic parameters are not necessarily correlated and so, when there are multiple possible values for a couple or more of the intrinsic parameters, a Cartesian product of all sets can be used as an initial estimation thereof for the optimization and a solution can be selected which yields a minimal cost function.

DMD pixels are often square so without being given any other indication the parameter $\alpha$ is given a value of 1 in an initial estimation, however, other initial values of "a" can be used, for example when parameters of an image modulator of a projector are provided with a projector. Since the effect of the nonlinear parameters k in Equation (5) can be small, as described above, in the initial estimation it can be assumed that they are all zero. This can reduce the search space since there is one initial estimation for those parameters.

However, with regards to offset parameters $[o_x, o_y]$ and the factor f, there can be multiple possible values, and estimations can be generated by considering all possible combinations of these parameters. However, considering large numbers of combinations can be computationally challenging; as such subsets of each can be selected as discussed hereafter. In particular, a grid of values for each of offset parameters $[o_x, o_y]$ and the factor f is determined, and the size (e.g. number of terms) of the grid can be selected based on available processing resources and/or heuristically to reduce an amount of time to implement the above algorithm, The offset values $[o_x, o_y]$ are related to lens shift at projector 207 and can be expressed in pixel units. Specifically, these offset values $[o_x, o_y]$ are the pixel coordinates of the principal point on the DMD (and/or the image modulator, e.g. see FIG. 4). To sample the possible coordinates of principal point on the DMD, $o_x$ can be assumed to have one of the three following values:

$$O_x = \{0.25 * Res_x, 0.5 * Res_x, 0.75 * Res_x\} \quad \text{Equation (7)}$$

where $Res_x$ is the width of the DMD in pixels (e.g. in designated "x" direction).

Similarly, $o_y$ can be assumed to have one of the three following values:

$$O_y = \{0.25 * Res_y, 0.5 * Res_y, 0.75 * Res_y\} \quad \text{Equation (8)}$$

where $Res_y$ is the height of the DMD in pixels (e.g. in designated "y" direction orthogonal to the "x" direction).

Hence positions across the DMD at three positions in each of two orthogonal directions can be considered, though more positions than three, and fewer positions than three can also be used. However, using three values each for $o_x, o_y$ leads to a search grid of (assuming the first value in each pair is multiplied by $Res_x$ and the second value is multiplied by $Res_y$:

[0.25 0.25] [0.25 0.50] [0.25 0.75]
[0.50 0.25] [0.50 0.50] [0.50 0.75]
[0.75 0.25] [0.75 0.50] [0.75 0.75]

In other words, sets of offset values $[o_x, o_y]$ that are considered can be a Cartesian product of $O_x$ and $O_y$:

$$O = O_x \times O_y \quad \text{Equation (9)}$$

Using the resolution of the DMD (which can be assumed to be generally known, for example as data provided with the DMD) and assuming that lens 211 covers the entire DMD (e.g. lens 211 can accept all light modulated by the DMD as an image for projection), approximations of the parameter f can also be determined.

Assuming a field of view v and using only linear terms for lens Equation (5) (e.g. assuming M=0):

$$\frac{Res_x}{2} = f \frac{v}{2} \quad \text{Equation (10)}$$

In other words, v/2 corresponds to a $\theta$ that yields an $$r\left(\frac{v}{2}\right) = \frac{Res_x}{2}.$$

Thus:

$$f = \frac{Res_x}{v} \quad \text{Equation (11)}$$

The field of view parameter is a property of lens 211 and initially is not known but can generally be assumed to be between 90 degrees up to 270 degrees; hence, as with offset values $[o_x, o_y]$ a search grid can be defined based on available processing resources. In some implementations, such a grid can comprise a range of values from 90 degrees up to 270 degrees, in 45 degrees increments, however other ranges and other increments can be used. Such a range and increment size can be selected based on processing resources at device 201 and/or to reduce an amount of time for performing the algorithm described above, while still selecting initialization values that will lead to convergence. Hence, a set of possible values for f can be obtained as follows:

$$R = \left\{\frac{Res_x}{90}, \frac{Res_x}{135}, \frac{Res_x}{180}, \frac{Res_x}{225}, \frac{Res_x}{270}\right\} \quad \text{Equation (12)}$$

A combined set of initial estimations for the intrinsic parameters is the Cartesian product:

$$G = R \times O_x \times O_y \quad \text{Equation (13)}$$

Again, this approach assumes that the aspect ratio "a" is 1 and nonlinear coefficients of Equation (1) are set to 0.

Hence, the algorithm above can be performed for each element in the set G to determine a convergence of the error function.

Hence, in this technique, input can be resolution of projector 207, and can be output would be a set of combinations initial estimates of the intrinsic parameters, with non-linear terms ("k") set to zero, and the term "a" set to "1". Hence, the elements of the "G" of Equation (13) can be of a format [f,$o_x$,$o_y$]. So for example, two example elements could be:

$$\left[\frac{Res_x}{180}, 0.25*Res_x, 0.75*Res_y\right] \text{ and } \left[\frac{Res_x}{90}, 0.5*Res_x, 0.25*Res_y\right].$$

Initialize Extrinsic Parameters (e.g. as in Block 303)

Given a set and/or grid of initial estimations for the intrinsic parameters (e.g. as defined in Equation (13), an estimation of an approximation for the extrinsic parameters can be obtained for each element in the grid. As described hereafter, a "flattening" technique can be used to initially estimate the extrinsic parameters using the intrinsic parameters as defined in Equation (13) as input, and assuming that non-linear terms of Equation (1) are initially set to "0".

Figure 5:
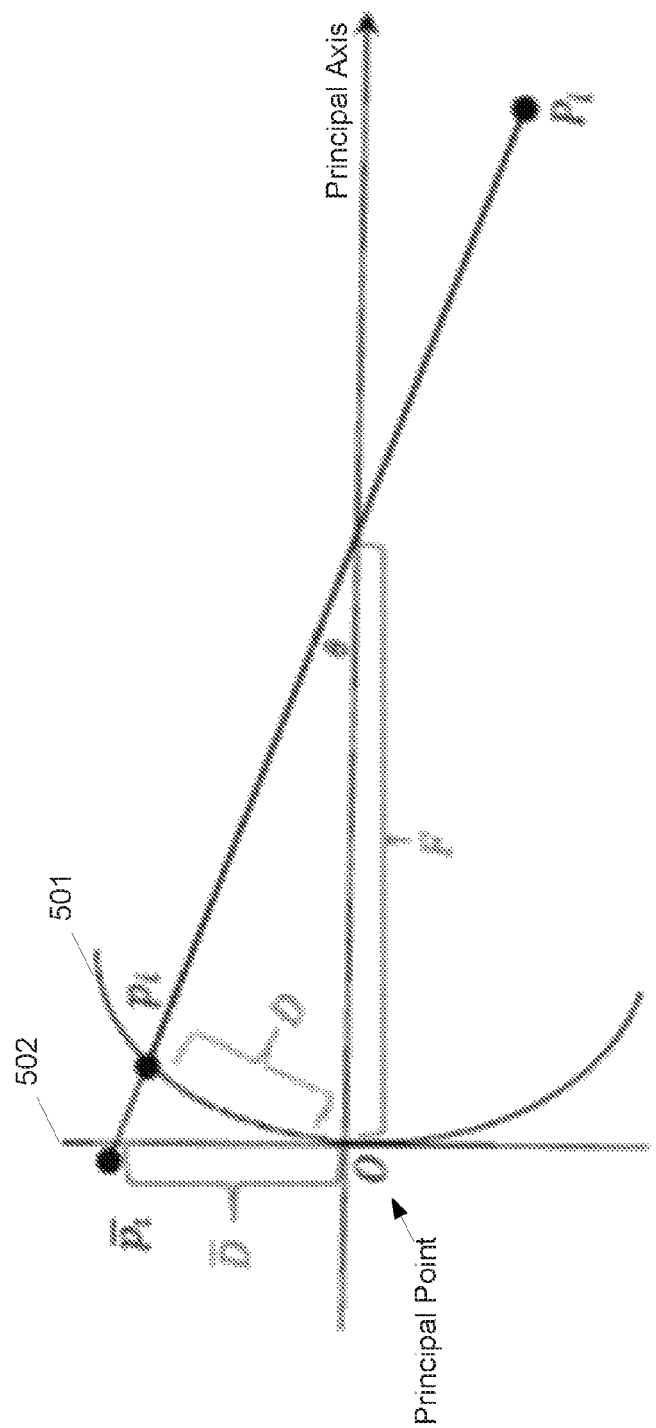
FIG. 5 depicts a flattening technique that can be used to estimate extrinsic parameters of a projector, according to non-limiting implementations.

With reference to FIG. 5, a technique can be used for initially estimating the extrinsic parameters that assumes that projector 207 is modified to include: a planar lens and a theoretical curved DMD 501 that would lead to behaviour of projection of light that is similar to when a "normal" flat DMD is used with lens 211. A shape and/or curvature of DMD 501 is determined from values of G in Equation (13), and in particular, each set of [f, ox, oy] that define an initial estimate of the shape and/or curvature of lens 211 are used to define an initial estimate of the shape and/or curvature of DMD 501 (and assuming that non-linear terms of Equation (1) are initially set to "0"). Hence, again assuming that a pixel point pi is on DMD 501, and a planar lens would lead to a projection point Pi, for a given a set of correspondences $[P_i,p_i]_{i=1}^N$, a new set of correspondences $[P_i,\tilde{p}_i]_{i=1}^N$ can be generated such that a flattened pixel point $\tilde{p}_i$ is a "flattened" coordinate on a flat DMD 502, flattened pixel point A determined by extrapolating back from a line between projection point Pi and pixel point $\tilde{p}_i$ of DMD 501, assuming that each DMD 501, 502 shares a common principal point, as depicted in FIG. 5. Hence, the term "flattened" can refer to a pixel point that would have occurred had projector 207 included a planar lens rather than non-planar lens 211. Furthermore, while the curvature and/or shape of curved DMD 501 can be determined from the intrinsic parameters as defined in Equation (13), in other implementations, the initial estimate of the intrinsic parameters of projector 207 can be obtained heuristically, for example as manual input to the algorithm described above (which can be received using an input device at device 201).

With further reference to FIG. 5, and put another way, in the flattening technique it is assumed that projector 207 is projecting with a planar lens, but a similar image results as it is further assumed that pixel points $p_i$ are located on curved DMD 501 of a shape that will cause the same image to be projected with a planar lens as when a flat DMD is used with lens 211. As such, flattened pixel points $\tilde{p}_i$ are assumed to be located on flat DMD 502 with a size and shape that would have caused corresponding projector point Pi. Hence, in FIG. 5, pixel points A, $p_i$ and projector point Pi are all located on a same line.

A DLT (Direct Linear Transformation) algorithm can be used to calculate extrinsic parameters based on the $[P_i,\tilde{p}_i]_{i=1}^N$ correspondences, for example using the using the intrinsic parameters as defined in Equation (13) as input, and assuming that non-linear terms of Equation (1) are initially set to "0". However, boundaries can be placed on angles used in the DLT algorithm to take into account that the algorithm can be unstable close to 90°, for example. Hence, a boundary of an angle θ with the principal axis of less than about 78 degrees can be selected to avoid large errors that can occur at an edge of a fisheye lens and/or f-theta lens field of view, as such large errors can dominate an estimation using this "flattened" plane technique. However, larger or smaller limits can be placed on angle θ. For example, with respect to FIG. 5, D can be an arc length from principal point O to $p_i$, $\tilde{D}$ can be the length from principal point O to $\tilde{p}_i$ and F can be a focal length of the (theoretical) flattened lens; all lengths can be expressed in pixel width units. Using Equation (5), D can be estimated as (assuming "D" is analogous to "r"):

$$D \approx f\theta \quad \text{Equation (14)}$$

where θ can be expressed in degrees.

From geometry D can also be expressed using radians:

$$D = F\theta^{[rad]} = F\theta\frac{\pi}{180} \quad \text{Equation (15)}$$

where $\theta^{[rad]}$ is θ expressed in radians (as opposed to degrees) and F is the focal length of the flattened lens.

Hence the focal length F of the flattened lens can be related to the linear factor, f, of Equation (5):

$$F = f180/\pi \quad \text{Equation (16)}$$

And then $\tilde{D}$ can be determined as a planar projection of $P_i$ using trigonometry:

$$\tilde{D} = F\tan(\theta) = F\tan(D/f) \quad \text{Equation (17)}$$

As D can also be referred to as the geodesic distance of a pixel point pi from the principal point O on the "fisheye" curved DMD 501 and can be calculated from the xy-pixels coordinates (assuming they are available and/or can be determined) using:

$$D = \sqrt{(p_x^i - o_x)^2 + \left(\frac{1}{a}(p_y^i - o_y)\right)^2} \quad \text{Equation (18)}$$

Coordinates of $\tilde{p}_i$ can be derived similarly to that of $p_i$ as follows:

$$\overline{p_x^r} = \tilde{D}\cos(\varphi) + o_x \quad \text{Equation (19)}$$
$$\overline{p_y^r} = a\cdot\tilde{D}\sin(\varphi) + o_y$$

Where angle φ is similar to angle φ described with reference to FIG. 4.

From the coordinates of $\tilde{p}_i$ defined in Equations (19), an initial estimate of the extrinsic parameters can be obtained using the DLT algorithm, which results, for example in an initial estimate of x,y,x coordinates of projector 207, as well as a yaw, a pitch and a roll, such that the 6-dimensional vector [x,y,z,yaw,pitch,roll] can be populated for each of set of initial estimates of intrinsic parameters defined in Equation (13).

Hence, using these two techniques, a grid of initial estimates of the intrinsic parameters can be automatically selected, and an initial estimate of corresponding extrinsic parameters can be determined, and each set of initial estimates of intrinsic parameters and extrinsic parameters can be evaluated using the above described algorithm; furthermore, evaluating each set of initial estimates of intrinsic parameters and extrinsic parameters can include adding non-linear terms as described above, until a best fit and/or convergence occurs.

In particular, in the above initial estimates of intrinsic parameters $[f,o_x,o_y,a]$ are derived and corresponding initial estimates of the extrinsic parameters [x,y,z,yaw,pitch,roll] are derived. The initial estimates of intrinsic parameters $[f,o_x,o_y,a]$ are used to mathematically "flatten" projector points which can enable use of a linear DLT algorithm linear method (DLT) to solve for the initial estimates of the extrinsic parameters [x,y,z,yaw,pitch,roll].

Put another way, and with reference to method 300, results of blocks 301, 303 result in a set of initial guesses for vector V, and used as input to blocks 305, 307 wherein each element in for each element in the set of initial guesses for vector V is evaluated, resulting in multiple solutions. A solution is selected based on the "err" value associated which each solution so the solution with the minimum "err" value is selected as $V_f$, which is used to project images at block 309.

Figure 6:
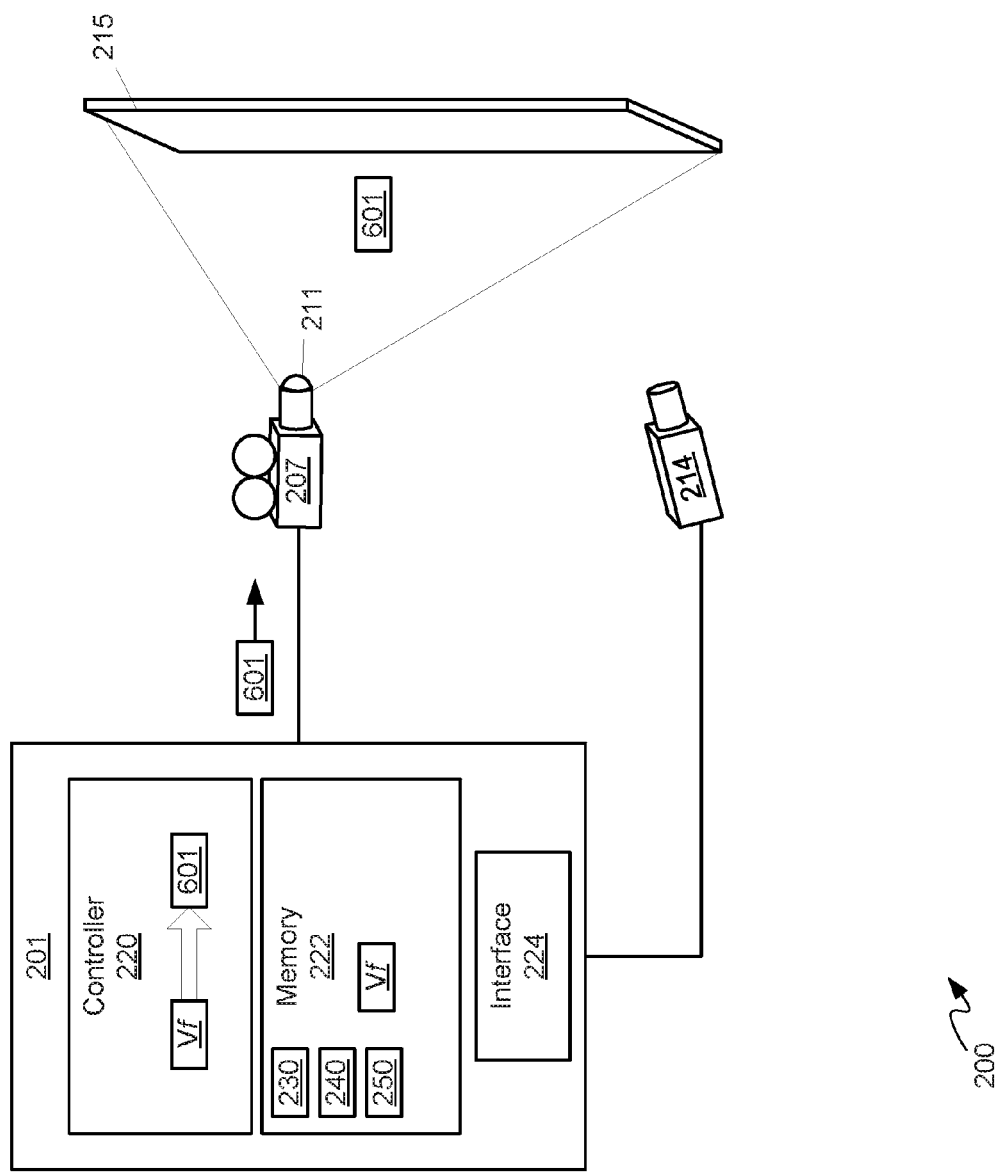
FIG. 6 depicts the system of FIG. 2 projecting images using the method of FIG. 3, according to non-limiting implementations.

With reference to FIG. 6, which is substantially similar to FIG. 2, with like elements having like numbers, and which depicts a non-limiting implementation of block 309, once convergence has been found, vector $V_f$ can be stored in memory 222 (for example as pose data) and controller 220 process vector $V_i$ to generate images 601, which is used to control projector 207 to project images 601 onto screen 215 based on vector $V_f$ (e.g. on the pose data).

Figure 7:
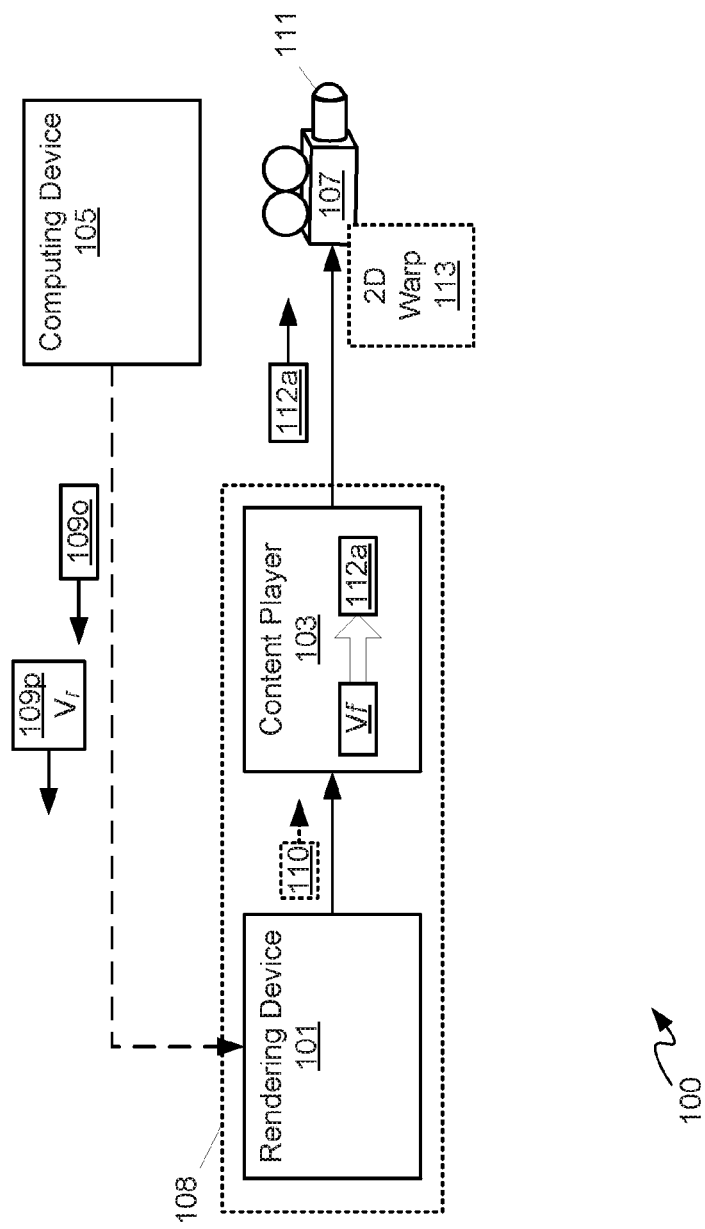
FIG. 7 depicts the system of FIG. 1 projecting images using the method of FIG. 3, according to non-limiting implementations.

Similarly, with reference to FIG. 7, which is substantially similar to FIG. 1, with like elements having like numbers, and which depicts a non-limiting implementation of block 309, once convergence has been found, vector $V_f$ can be provided to device 108 (for example as pose data 109p) and controller 220 process vector $V_f$ to generate projection data 112a (similar to projection data 112, but adapted for projection by a fisheye lens and/or an f-theta lens and/or a non-planar lens), which is used to control projector 107 to project images based on vector $V_f$ (e.g. on pose data 109p).

Hence, provided herein is a system and method for advanced lens geometry fitting for projecting images using a projector with a non-planar lens. An initial estimate of intrinsic parameters of the projector can be determined, for example from a list; an initial estimate of extrinsic parameters of the projector can be determined based on the initial estimate of intrinsic parameters. The intrinsic parameters and extrinsic parameters can be optimized together by starting with a simple lens model and iteratively adding nonlinear terms, an error function evaluated at each iteration, for example for each set of intrinsic parameters in the list and the corresponding extrinsic parameters. As the values of the error function converges (and the like) the optimized intrinsic parameters and the optimized extrinsic parameters can be used to generate images that are projected by the projector. Furthermore, input to the techniques described herein can merely include a resolution of the projector, an aspect ratio of pixels of the projector, and correspondences between pixels points and projector points.

Furthermore, it is appreciated that techniques described herein could also be applied to determine similar pose data for a camera, assuming that an initial correspondence between camera points in space (e.g. in a field of view of a camera) and pixel points of an imager of the camera (such as a CCD (charge couple device) of the camera were provided, as well as a resolution of the camera and a value similar to "a" described herein (e.g. pixel width divided by pixel height).

Figure 8:
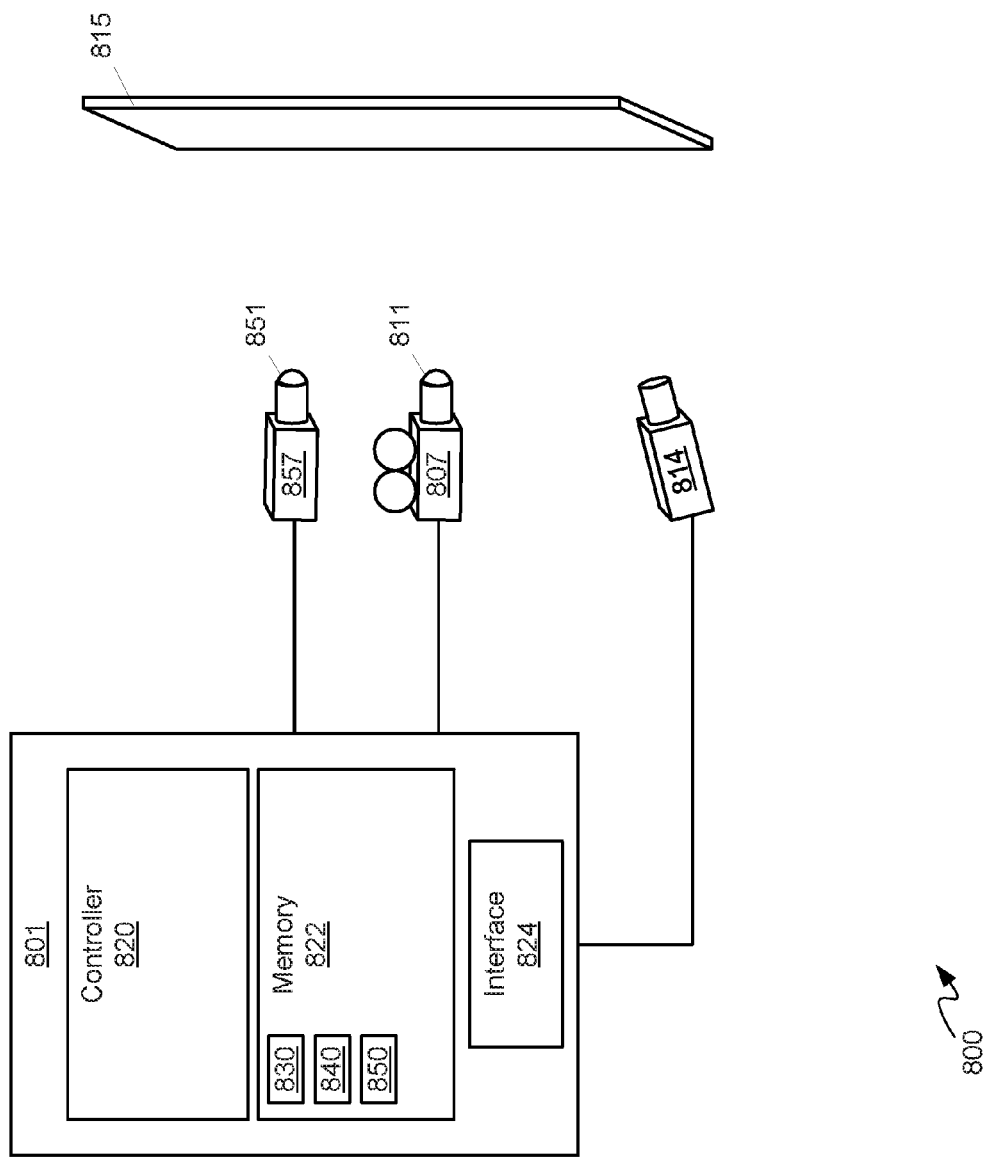
FIG. 8 depicts a system for advanced lens geometry fitting for acquiring images, according to non-limiting implementations.

For example, attention is next directed to FIG. 8 which depicts a system 800 for advanced lens geometry fitting for projecting images. Indeed, computing device 105 can include one or more components of system 800, and furthermore components of system 100 can comprise components of system 800 as desired. Furthermore, system 800 is similar to system 200, with like elements having like numbers, however in an "800" series rather than a "200" series. Furthermore, compared to system 200, in system 800 a projector is optional and system 800 further includes a camera with a non-planar lens. Hence, system 800 comprises a computing device 801 (interchangeably referred to hereafter as device 801), a camera 857, comprising a non-planar lens 851; an optional projector 807 (e.g. comprising a non-planar lens 811), an optional camera 814; and a screen 815 being imaged by camera 857 (and onto which images from projector 807 are optionally to be projected). It is assumed that optional camera 814 can be used to determine geometry of screen 215 and to determine correspondences between imaged points of camera 857 to pixel points of camera 857.

Furthermore, similar to system 200, while present implementations of system 800 are described with respect to screen 815, in other implementations, screen 815 can be replaced with an object, including a three-dimensional object, and camera 857 can image the object.

In addition, device 801 generally comprises a controller 820, a memory 822 and a communication interface 824 (interchangeably referred to hereafter as interface 824).

In particular, memory 822 stores an application 830 that, when processed by controller 820, enables, controller 820 and/or computing device 801 to: using an initial model of non-planar lens 851 that relates a position of points on an object (including, but not limited to screen 815) to pixel points at an imager of camera 857, determine at least one initial estimate of intrinsic parameters of camera 857 using the initial model; determine at least one initial estimate of extrinsic parameters of camera 857 using the at least one initial estimate of the intrinsic parameters; iteratively evaluate an error function that includes a comparison between the pixel points and a transformation of the points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the model of non-planar lens 851, in one or more of the iterations; varying intrinsic parameters of camera 857; and varying extrinsic parameters of camera 857; when the error function, of one or more iterations, one or more of converges, reaches a minimum, and is less than a threshold value: store current value of the intrinsic parameters of camera 857 and the extrinsic parameters of camera 857 as pose data; and, control camera 857 to acquire images of the object (including, but not limited to screen 815) based on the pose data.

In other implementations, as depicted, memory 822 further stores a model 840 of the object (e.g. screen 815), which can be determined using camera 814 and/or projector 807 (presuming pose data of projector 807 has been determined (e.g. using method 300) and/or is known) (and/or another projector, not depicted), for example, by controlling a projector, and the like, to project images, such as boxes, structured light patterns, and the like, onto the object (e.g. screen 815) and determine a geometry thereof from images acquired by camera 814; however, in other implementations, model 840 can be provisioned at memory 822 using, for example, a given digital model supplied with the object (e.g. screen 815).

Furthermore, camera 814 can be used in a process to map points on an object (e.g. screen 815) to pixel points of an imager of camera 857. For example, computing device 801 can control a projector (including, but not limited to, projector 807) to project pixels onto an object (e.g. screen 815), including, but not limited to, structured light patterns; both of camera 857 and camera 814 can acquire a respective digital picture of the object (e.g. screen 815) onto which the pixels are being projected and convey those digital pictures to computing device 801. Assuming that a relative geometry of camera 814 and the object (e.g. screen 815) onto which the pixel is being projected is known and/or has been determined (e.g. from model 840), then a set of correspondences between the points projected on to the object and the pixel points at the imager of camera 857 can be determined.

Alternatively, a mapping of points on an object (e.g. screen 815) to pixel points of an imager of camera 857 can also be determined by placing an image onto the object. For example, one or more physical pictures of distinguishable features at known positions (including, but not limited to, a grid of distinguishable points, and/or features), which can be referred to as fiducials, can be placed in front of screen 815 and imaged by camera 857. Image(s) of the one or more physical picture is provided to device 801.

In yet further implementations, system 800 comprises two or more cameras 814 positioned to image the object (e.g. screen 815), for example in a stereo vision arrangement, and a mapping of points on an object (e.g. screen 815) to pixel points of an imager of camera 857 can also be determined using a feature detection algorithm and/or camera vision algorithms and/or machine vision algorithms (e.g. scale-invariant feature transform (SIFT)) on the images from both cameras 814. Such a mapping in these implementations can be obtained without the use of projector 807 which is optional. Furthermore, such a mapping can be obtained without the use of fiducials, however such a mapping can also be obtained with fiducials and/or using structured light patterns, and the like, projected onto the object using projector 807, and the like.

In any event, any combination of cameras, projectors, fiducials, structured light patterns and the like can be used to determine a mapping of points on an object (e.g. screen 815) to pixel points of an imager of camera 857, In particular, physical 3D (three-dimensional) points in camera space, $C^p$ (e.g. points in an imaging path which can be between lens 851 and screen 815), and respective coordinates, pc, of their mapping back to a plane of an imager of camera 851 are determined (also referred to as pixel points). Indeed, points in camera space, $C^p$ are similar to points in projector space $P^p$ described above. And respective coordinates, pc, of their mapping back to a plane of an imager of camera 857 are similar to coordinates (and/or pixel points), p, of their mapping back to a plane of a DMD of projector 207. Hence, the imager of camera 851 can include, but is not limited to, a CCD (charge coupled device), a CMOS (complementary metal-oxide-semiconductor) based imager, an NMOS (N-type metal-oxide-semiconductor) based imager, and the like. Indeed, any type of imager and/or spatial imager and/or image sensor which can image an object on a pixel-by-pixel basis is within the scope of present implementations, including, but not limited to, rastering-based imagers.

Furthermore, as depicted, memory 822 further stores an initial model 850 of lens 851 which can be supplied with lens 851, for example by a manufacturer and/or can be determined based on a type of lens 851. Hence, for example, when lens 851 comprises an f-theta lens, a model of lens 851 can comprise a known model of an f-theta lens.

In any event, once the mapping of the points on the object (e.g. screen 815) to pixel points of an imager of camera 857 are determined and/or acquired and/or provided, and initial model 850 of non-planar lens 851 is provided, techniques described above with respect to determining pose data 109p of projector 207 can be used to determine similar pose data for camera 857.

For example, attention is now directed to FIG. 9, which depicts a flowchart of a method 900 for advanced lens geometry fitting for acquiring images using a camera, according to non-limiting implementations. In order to assist in the explanation of method 900, it will be assumed that method 900 is performed using system 800, and specifically by controller 820 of device 801, for example when controller 820 processes application 830. Indeed, method 900 is one way in which system 800 and/or device 801 can be configured. Furthermore, the following discussion of method 900 will lead to a further understanding of device 801, and system 800 and its various components. However, it is to be understood that system 800 and/or device 801 and/or method 900 can be varied, and need not work exactly as discussed herein in conjunction with each other, and that such variations are within the scope of present implementations.

Regardless, it is to be emphasized, that method 900 need not be performed in the exact sequence as shown, unless otherwise indicated; and likewise various blocks may be performed in parallel rather than in sequence; hence the elements of method 900 are referred to herein as "blocks" rather than "steps". It is also to be understood, however, that method 900 can be implemented on variations of system 800 as well. Furthermore, while computing device 801 is described as implementing and/or performing each block of method 900, it is appreciated that each block of method 900 occurs using controller 820 processing application 830.

At block 901, controller 820, using an initial model of non-planar lens 851 that relates a position of points on an object (including, but not limited to screen 215) to pixel points at an imager of camera 857, determines at least one initial estimate of intrinsic parameters of camera 857 using the initial model.

At block 903, controller 820 determines at least one initial estimate of extrinsic parameters of camera 857 using the at least one initial estimate of the intrinsic parameters.

At block 905, controller 820 iteratively evaluates an error function that includes a comparison between the pixel points and a transformation of the points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the initial model of non-planar lens 851 in one or more of the iterations; varying intrinsic parameters of camera 857; and varying extrinsic parameters of camera 857.

At block 907, controller 820, when the error function, of one or more iterations, one or more of converges, reaches a minimum, and is less than a threshold value: stores current value of the intrinsic parameters of camera 857 and the extrinsic parameters of camera 857 as pose data.

At block 909, controller 820 controls camera 857 to acquire images of the object (including, but not limited to screen 215) based on the pose data.

Indeed, method 900 proceeds similar to the examples of FIG. 4 through FIG. 7, but in camera space rather than projector space, and with images being acquired rather than projected. For example, images by camera 857 at block 909 can be corrected by system 100 and/or device 201 based on the pose data determined at block 907, for example to warp the images prior to being displayed.

Indeed, method 300 and method 900 are similar and each assume that an imaging device, such as a DMD, a CCD, a CMOS-based imager, an NMOS-based imager, and the like, interact with an object via a non-planar lens, regardless of whether the imaging device is projecting images onto an object using a non-planar lens, or acquiring images of an object using a non-planar lens. Indeed, each assume that an initial mapping is provided between pixel points of the imaging device and points on an object, and each further assume that an initial model of the non-planar lens is provided.

Figure 10:
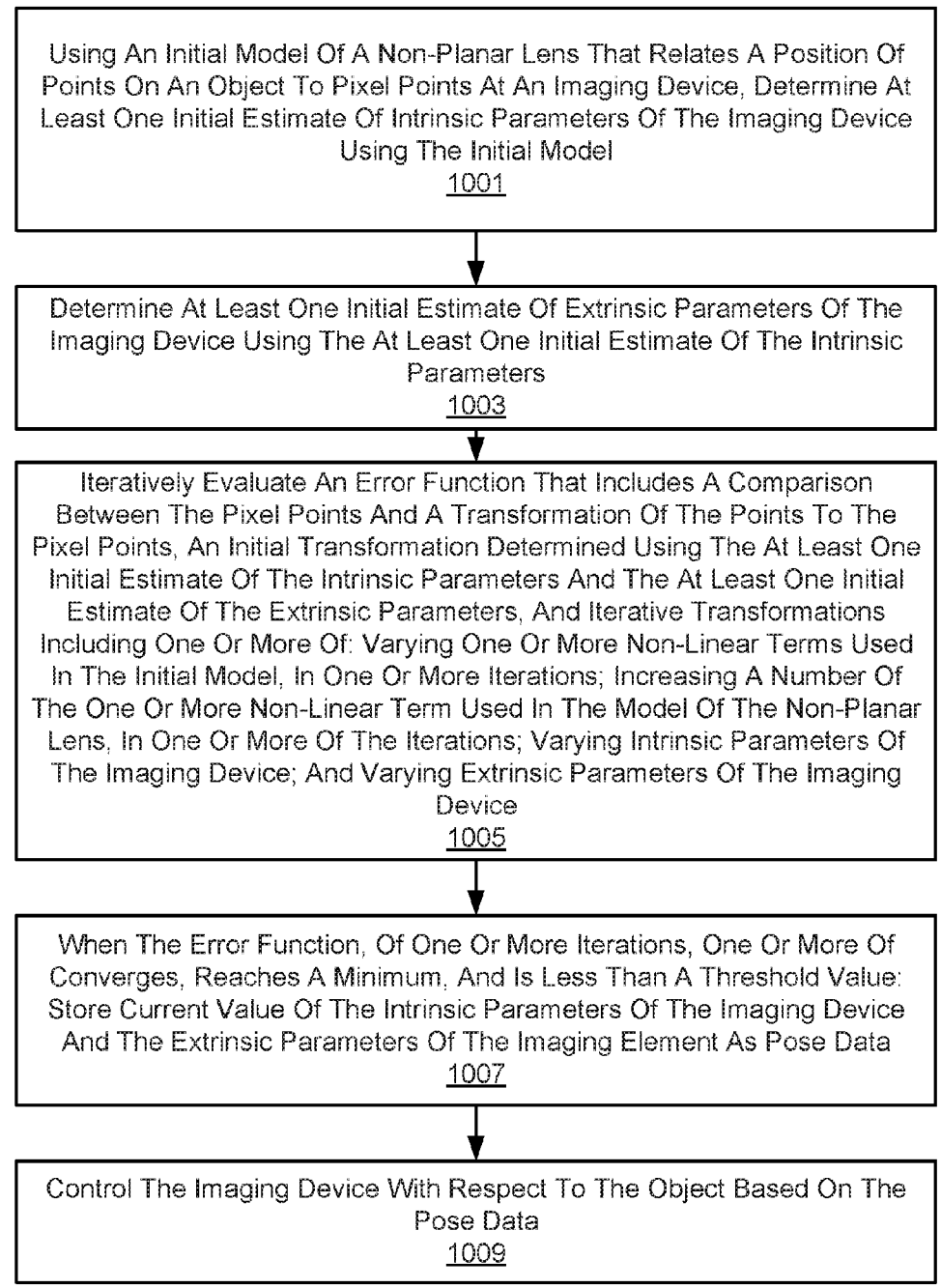
FIG. 10 depicts a method for advanced lens geometry fitting for imaging devices, according to non-limiting implementations.

Hence, attention is now directed to FIG. 10, which depicts a flowchart of a generic method 1000 for advanced lens geometry fitting for imaging devices, according to non-limiting implementations, the imaging devices including any spatially controlled device for acquiring and/or generating images such as projector 207 and/or camera 857. In order to assist in the explanation of method 1000, it will be assumed that method 1000 is performed using a controller in communication with an imaging device, such as controller 220 in communication with projector 207 and/or controller 820 in communication with camera 857. Indeed, method 1000 is one way in which systems include imaging devices and/or controllers in communication with such imaging devices can be configured. Furthermore, the following discussion of method 1000 will lead to a further understanding of such systems, devices and/or controllers and their various components. However, it is to be understood that such systems, devices and/or controllers can be varied, and need not work exactly as discussed herein in conjunction with each other, and that such variations are within the scope of present implementations.

Regardless, it is to be emphasized, that method 1000 need not be performed in the exact sequence as shown, unless otherwise indicated; and likewise, various blocks may be performed in parallel rather than in sequence; hence the elements of method 1000 are referred to herein as "blocks" rather than "steps". It is also to be understood, however, that method 1000 can be implemented on variations of such systems, devices and controllers as well.

As with method 300 and method 900, it is assumed in method 1000 that an imaging device includes a non-planar lens, an initial model of the non-planar lens is provided, as well as a mapping between pixel points of the imaging device and points on the object.

At block 1001, a controller, using an initial model of non-planar lens that relates a position of points on an object (including, but not limited to a screen) to pixel points at an imaging device, determines at least one initial estimate of intrinsic parameters of the imaging device using the initial model.

At block 1003, the controller determines at least one initial estimate of extrinsic parameters of the imaging device using the at least one initial estimate of the intrinsic parameters.

At block 1005, the controller iteratively evaluates an error function that includes a comparison between the pixel points and a transformation of the points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the initial model of the non-planar lens in one or more of the iterations; varying intrinsic parameters of the imaging device; and varying extrinsic parameters of the imaging device.

At block 1007, the controller, when the error function, of one or more iterations, one or more of converges, reaches a minimum, and is less than a threshold value: stores current value of the intrinsic parameters of the imaging device and the extrinsic parameters of the imaging device as pose data.

At block 1009, the controller controls the imaging device to interact with the object (including, but not limited to a screen) based on the pose data. For example, the imaging device one of projects images as described with respect to method 300, or acquires images, as described above with respect to method 900.

Those skilled in the art will appreciate that in some implementations, the functionality of devices 101, 105, 108, 201, and content player 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 105, 108, 201, and content player 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a computing device; a projector comprising a non-planar lens, the projector configured for projection onto a object; the computing device configured to:
using an initial model of the non-planar lens that relates a position of projected points on the object to pixel points at an image modulator of the projector, determine at least one initial estimate of intrinsic parameters of the projector using the initial model;
determine at least one initial estimate of extrinsic parameters of the projector using the at least one initial estimate of the intrinsic parameters;
iteratively evaluate an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model of the non-planar lens, in one or more iterations; increasing a number of the one or more nonlinear terms used in the initial model of the non-planar lens, in one or more of the iterations;
varying intrinsic parameters of the projector; and varying extrinsic parameters of the projector;
when the error function, of one or more iterations, one or more of converges, reaches a minimum, and is less than a threshold value: store current value of the intrinsic parameters of the projector and the extrinsic parameters of the projector as pose data; and,
control the projector to project images onto the object based on the pose data.

2. The system of claim 1, wherein the computing device is further configured to determine at least one initial estimate of intrinsic parameters of the projector using the initial model by determining a range of estimates for each of a plurality of the intrinsic parameters.

3. The system of claim 1, wherein the computing device is further configured to determine at least one initial estimate of intrinsic parameters of the projector using the initial model by determining a set of discrete estimates of a plurality of the intrinsic parameters.

4. The system of claim 3, wherein the computing device is further configured to determine the at least one initial estimate of extrinsic parameters for each of elements of the set of discrete estimates of the plurality of the intrinsic parameters.

5. The system of claim 4, wherein the computing device is further configured to determine the at least one initial estimate of the extrinsic parameters, for each of the elements of the set of discrete estimates of the plurality of the intrinsic parameters, by extrapolating a line between a given projection point and a corresponding point at a curved image modulator that has a curvature determined from each of the elements of the set of discrete estimates of the plurality of the intrinsic parameters, to a pixel point on flat image modulator that shares a principal point with the curved image modulator.

6. The system of claim 5, wherein the computing device is further configured to determine the at least one initial estimate of the extrinsic parameters using a direct linear transformation algorithm using a set of pixel points on the flat image modulator.

7. The system of claim 5, wherein the computing device is further configured to iteratively evaluate the error function for each element of the set of discrete estimates of the plurality of the intrinsic parameters and corresponding estimates of the extrinsic parameters.

8. The system of claim 1, wherein the non-planar lens comprises one or more of a fisheye lens and an f-theta lens, and wherein the initial model of the non-planar lens comprises one or more of a fisheye lens model and an f-theta lens model.

9. The system of claim 1, wherein the initial model of the non-planar lens comprises one or more of: zero non-linear terms, one non-linear term, and a plurality of non-linear terms.

10. A method comprising:
at a computing device in communication with a projector comprising a non-planar lens, the projector configured for projection onto a object:
using an initial model of the non-planar lens that relates a position of projected points on the object to pixel points at an image modulator of the projector, determining, at the computing device, at least one initial estimate of intrinsic parameters of the projector using the initial model;
determining, at the computing device, at least one initial estimate of extrinsic parameters of the projector using the at least one initial estimate of the intrinsic parameters;
iteratively evaluating, at the computing device, an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model of the non-planar lens, in one or more iterations; increasing a number of the one or more nonlinear terms used in the initial model of the non-planar lens in one or more of the iterations; varying intrinsic parameters of the projector; and
varying extrinsic parameters of the projector;
when the error function, of one or more iterations, one or more of converges, reaches a minimum, and is less than a threshold value: store current value of the intrinsic parameters of the projector and the extrinsic parameters of the projector as pose data; and,
controlling, at the computing device, the projector to project images onto the object based on the pose data.

11. The method of claim 10, further comprising: determining at least one initial estimate of intrinsic parameters of the projector using the initial model by determining a range of estimates for each of a plurality of the intrinsic parameters.

12. The method of claim 10, further comprising: determining at least one initial estimate of intrinsic parameters of the projector using the initial model by determining a set of discrete estimates of a plurality of the intrinsic parameters.

13. The method of claim 12, further comprising: determining the at least one initial estimate of extrinsic parameters for each element of the set of discrete estimates of the plurality of the intrinsic parameters.

14. The method of claim 13, further comprising: determining the at least one initial estimate of the extrinsic parameters by extrapolating a line between a given projection point and a corresponding point at a curved image modulator that has a curvature similar to that of the non-planar lens, to a pixel point on flat image modulator that shares a principal point with the curved image modulator.

15. The method of claim 14, further comprising: determining the at least one initial estimate of the extrinsic parameters using a direct linear transformation algorithm using a set of pixel points on the flat image modulator.

16. The method of claim 13, further comprising: iteratively evaluating the error function for each element of the set of discrete estimates of the plurality of the intrinsic parameters and corresponding estimates of the extrinsic parameters.

17. The method of claim 10, wherein the non-planar lens comprises one or more of a fisheye lens and an f-theta lens, and wherein the initial model of the non-planar lens comprises one or more of a fisheye lens model and an f-theta lens model.

18. The method of claim 10, wherein the initial model of the non-planar lens comprises one or more of: zero non-linear terms, one non-linear term, and a plurality of non-linear terms.

19. A non-transitory computer-readable medium storing a computer program, wherein execution of the computer program is for:
- at a computing device in communication with a projector comprising a non-planar lens, the projector configured for projection onto a object:
  - using an initial model of the non-planar lens that relates a position of projected points on the object to pixel points at an image modulator of the projector, determining, at the computing device, at least one initial estimate of intrinsic parameters of the projector using the initial model;
  - determining, at the computing device, at least one initial estimate of extrinsic parameters of the projector using the at least one initial estimate of the intrinsic parameters;
  - iteratively evaluating, at the computing device, an error function that includes a comparison between the pixel points and a transformation of the projected points to the pixel points, an initial transformation determined using the at least one initial estimate of the intrinsic parameters and the at least one initial estimate of the extrinsic parameters, and iterative transformations including one or more of: varying one or more nonlinear terms used in the initial model, in one or more iterations; increasing a number of the one or more nonlinear terms used in the initial model of the non-planar lens in one or more of the iterations; varying intrinsic parameters of the projector; and varying extrinsic parameters of the projector;
  - when the error function, of one or more iterations, one or more of converges, reaches a minimum, and is less than a threshold value: store current value of the intrinsic parameters of the projector and the extrinsic parameters of the projector as pose data; and,
  - controlling, at the computing device, the projector to project images onto the object based on the pose data.

* * * * *